E. M. SNYDER.
COOKING DEVICE.
APPLICATION FILED APR. 7, 1922.
1,438,792.
Patented Dec. 12, 1922.
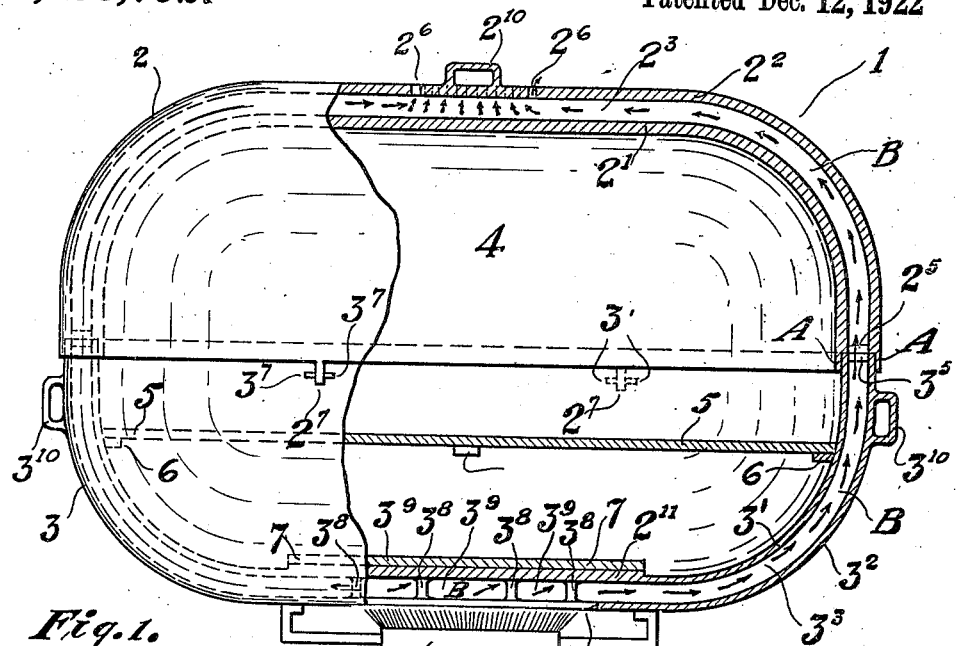
Fig. 1.
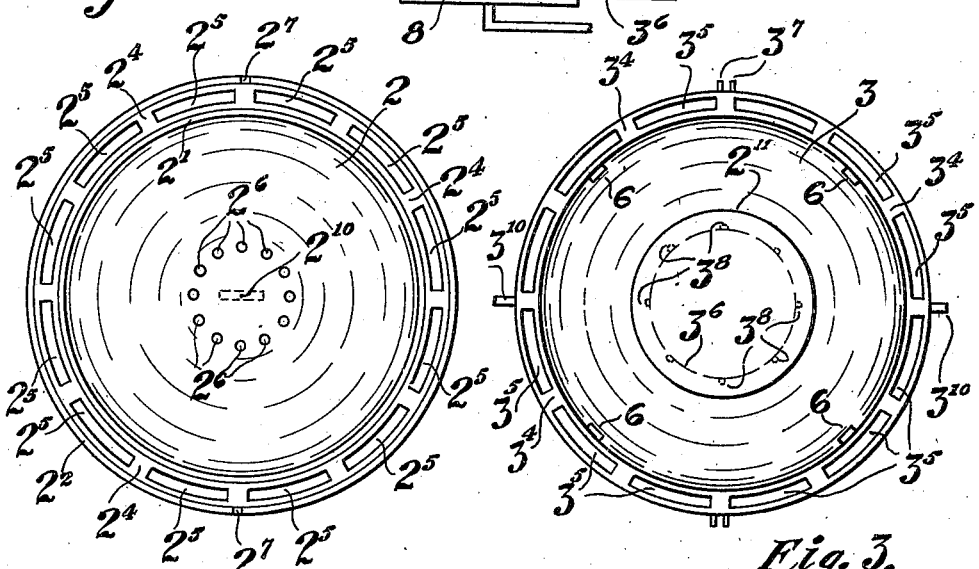
Fig. 2.
Fig. 3.
Witnesses
Inventor.
Edith M. Snyder.

Patented Dec. 12, 1922.

1,438,792

UNITED STATES PATENT OFFICE.

EDITH MARIA SNYDER, OF HAMILTON, ONTARIO, CANADA.

COOKING DEVICE.

Application filed April 7, 1922. Serial No. 550,464.

*To all whom it may concern:*

Be it known that I, EDITH MARIA SNYDER, a subject of the King of Great Britain, and a resident of the city of Hamilton, in the county of Wentworth, in the Province of Ontario, Canada, have invented certain new and useful Improvements in a Cooking Device, of which the following is a specification.

My invention relates to improvements in cooking devices with particular reference to portable ovens and the object of the invention is to provide a portable device in which any roasting or baking operations may be effectively done upon practically any form of stove; a further object is to effect great economy in heat; and a further object is to permit more sanitary cooking by keeping the flame and products of combustion entirely out of contact with the contents of the cooker; and a still further object is to make the device in a strong and convenient form which may be inexpensively produced.

My invention consists essentially of a cooking device comprising separate upper and lower dished members, the upper member adapted to be superimposed upon the lower member to form an entirely enclosed cooking chamber within the members, both members having inner and outer spaced shells, the space between said spaced shells constituting a flue channel completely surrounding the cooking chamber, the outer shell of the lower member having a large orifice in the bottom thereof and the outer shell of the upper member having a series of small orifices in the top thereof, all as hereinafter more particularly described and illustrated in the accompanying drawings in which, Fig. 1 is a side elevation of my improved cooking device with a portion of the near wall broken away to show the interior, the section being taken about the longitudinal centre line of the device, an ordinary gas ring upon which the device is supported being indicated diagrammatically.

Fig. 2 is a plan view of the top member of the device shown in the reversed or upside down position.

Fig. 3 is a plan view of the lower member of the device.

Like characters of reference indicate corresponding parts in the different views.

1 is my improved cooking device which comprises the upper dished member 2 superimposed upon the lower dished member 3 and forming between these members the enclosed cooking chamber 4.

The upper member 2 comprises the inner shell $2^1$ and the outer shell $2^2$ arranged in spaced relationship so that the space $2^3$ is formed between the two shells.

Adjacent to the lower edge of the upper member, the inner and outer shells are connected by the web portion $2^4$ which web portion is provided with the circumferentially disposed spaced orifices $2^5$.

The inner and outer shells $2^1$ and $2^2$ project slightly beyond the web $2^4$ and form an annular recess extending around the lower edge of the upper member (see at A in Fig. 1).

The outer shell of the upper member is provided with the series of small orifices $2^6$ in the top thereof.

$2^7$ are two depending fingers carried by the outer wall of the upper member.

The lower member 3 comprises the inner shell $3^1$ and the outer shell $3^2$ arranged in spaced relationship so that the space $3^3$ is formed between the two shells.

Along the upper edge of the lower member, the inner and outer shells are connected by the web portion $3^4$ which web portion is provided with the circumferentially disposed spaced orifices $3^5$.

The outer shell of the lower member is provided with a large orifice $3^6$ in the bottom thereof.

$3^7$ are two pairs of spaced lugs carried by the lower member and each pair is adapted to receive one of the fingers $2^7$ of the upper member for properly locating the upper and lower members with respect to each other as will presently appear.

$3^8$ are spaced vertical supports connecting the inner and outer shells of the lower member and are located circumferentially about the orifice $3^6$, and $3^9$ are the open spaces between adjacent supports.

$2^{10}$ is a handle carried by the upper member and $3^{10}$ are handles carried by the lower member.

The portion $2^{11}$ of the inner shell of the lower member which is located directly above the orifice $3^6$ is made of increased thickness and to the upper side thereof is secured a layer of asbestos 7.

5 is a tray which is removably mounted within the cooking chamber 4, being supported upon rests 6 carried by the inner shell of the lower member.

This tray is made of open mesh so as to permit free circulation of the air about the food within the cooking chamber 4.

8 indicates an ordinary gas ring upon which the device is supported (see Fig. 1).

The construction and operation of my invention is as follows:

The upper and lower members would be most probably cast of aluminum or other suitable metal.

After the articles to be cooked have been placed upon the tray 5 in the lower member, the upper member is superimposed over the lower member as shown in Fig. 1.

The members are so formed that the upper peripheral edge of the lower member engages the recess along the lower edge of the upper member so that the upper member straddles the lower and since the webs $2^4$ and $3^4$ contact with each other a tight joint is formed between the members (see at A in Fig. 1).

The orifices $2^5$ and $3^5$ in the webs are correspondingly disposed, so that when the fingers $2^7$ engage the lugs $3^7$ the orifices register.

It will now be apparent that since the orifices $2^5$ and $3^5$ register, that the spaces $2^3$ and $3^3$ formed between the inner and outer shells of the upper and lower members respectively, constitute a continuous chamber or channel surrounding the cooking chamber 4. For convenience in the description this chamber will be indicated by the letter B.

The device is now placed over the source of heat which may be a gas stove, as illustrated, or any other suitable type such as an oil stove, so that the flame is directly below the large orifice $3^6$ in the lower member (see Fig. 1).

It will now be evident that the flame and practically all the heat from the stove will enter directly through the orifice $3^6$ and that both the flame itself and all the hot gases of combustion will pass upwardly through the flue chamber "B" and will finally escape at the top through the series of orifices $3^6$. The path of these gases is indicated by the small arrows in Fig. 1.

In this way the greatest amount of heat from the stove will be utilized in actually heating the cooking chamber since it will all pass through the chamber "B" which surrounds the inner shell.

It is to be noted that owing to the method of connecting the upper and lower members that the cooking chamber is entirely enclosed and that while the heat and all products of combustion are brought into intimate heating communication with the cooking chamber that they are not permitted to enter the heating chamber and therefore while the maximum heating effect of the stove is produced in the cooking chamber, the articles being cooked therein, are kept entirely out of actual contact with the products of combustion.

This is a most important feature from a sanitary point of view as in the ordinary type of oven at present used with gas and oil stoves all the products of combustion pass directly into the oven and are in direct contact with the food being cooked therein, consequently tending to contaminate the food.

Furthermore since these former ovens are more or less open, there is a very considerable and serious waste of heat. This is not the case with my device in which the waste of heat is reduced to a minimum. By having the outer surface of the device polished the loss by radiation would be further minimized.

The metal of the inner shell of the lower member has been shown as made of increased thickness directly above the orifice $3^6$ to increase the durability of the device, since the flame bears directly upon the metal at this point. A layer of asbestos 7 is secured to the top of the metal $2^{11}$ to equalize the distribution of heat throughout the device since the flame bearing directly on the metal $2^{11}$ would ordinarily produce an excessively hot spot within the cooking chamber adjacent to the metal $2^{11}$.

From the foregoing it will be seen that I have devised an improved cooking device which will prove of great benefit and upon which all roasting and baking operations may be conveniently and economically performed, and which will further enable this cooking to be done in a more wholesome manner than hitherto.

Many modifications may be made in my invention without departing from the spirit of the same or the scope of the claims and the form shown is to be taken as illustrative only and not in a limiting sense.

For instance the shape and size may be altered as desired. Also the supports 8 might be omitted and if desired a damper might be used for regulating the exhaust openings $2^6$.

What I claim as my invention is:

1. A device of the class described comprising upper and lower dished members, the upper member adapted to be superimposed upon the lower member to form an enclosed cooking chamber between the members, both members having double walls, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof.

2. A device of the class described comprising upper and lower dished members, the upper member adapted to be superimposed upon the lower member to form an enclosed cooking chamber between the members, both members having double walls, webs connecting the lower edges of the inner and outer walls of the upper member and the upper edges of the inner and outer walls of the lower member, said webs provided with a plurality of registering orifices, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof.

3. A device of the class described comprising upper and lower dished members, the upper member adapted to be superimposed upon the lower member to form an enclosed cooking chamber between the members, both members having double walls, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof, the lower edge of the upper member being recessed and the upper edge of the lower member adapted to engage said recess.

4. A device of the class described comprising upper and lower dished members, the upper member adapted to be superimposed upon the lower member to form an enclosed cooking chamber between the members, both members having double walls, webs connecting the lower edges of the inner and outer walls of the upper member and the upper edges of the inner and outer walls of the lower member, said webs provided with a plurality of registering orifices, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof, and positioning means carried by the upper and lower members.

5. A device of the class described comprising upper and lower dished members, the upper member adapted to be superimposed upon the lower member to form an enclosed cooking chamber between the members, both members having double walls, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof, and a layer of non-conducting material covering the lower portion of the inner wall of the lower member.

6. A device of the class described comprising upper and lower dished members, the upper member adapted to be superimposed upon the lower member to form an enclosed cooking chamber between the members, both members having double walls, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof, and a layer of asbestos covering the lower portion of the inner wall of the lower member.

7. A device of the class described comprising upper and lower dished members, the upper member adapted to be superimposed upon the lower member to form an enclosed cooking chamber between the members, both members having double walls, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof, the metal of the bottom portion of the lower member being of increased thickness and a layer of asbestos covering said thick portion.

8. A device of the class described comprising upper and lower dished members, the upper member adapted to be superimposed upon the lower member to form an enclosed cooking chamber between the members, both members having double walls, the space between the inner and outer walls of the two members constituting a continuous chamber surrounding the cooking chamber when the device is in the superimposed position, the outer wall of the lower member having a large orifice at the bottom thereof and the outer wall of the upper member having an exhaust vent in the top thereof, and a horizontally disposed tray within the cooking chamber.

Signed at the city of Hamilton, Ontario, Canada, the 4th day of April 1922.

EDITH MARIA SNYDER.

Witnesses—
  W. D. MOEDEN,
  M. V. AITKEN.